United States Patent
Priem

Patent Number: 6,061,066
Date of Patent: May 9, 2000

[54] METHOD AND APPARATUS FOR CREATING PERSPECTIVE CORRECT GRAPHICAL IMAGES

[75] Inventor: Curtis Priem, Fremont, Calif.

[73] Assignee: Nvidia Corporation, Santa Clara, Calif.

[21] Appl. No.: 09/046,240

[22] Filed: Mar. 23, 1998

[51] Int. Cl.$^7$ .................................................. G06T 17/00
[52] U.S. Cl. .......................................................... 345/427
[58] Field of Search ................................... 345/418, 419, 345/420, 424, 425, 427

[56] References Cited

U.S. PATENT DOCUMENTS

| | | | |
|---|---|---|---|
| 5,764,871 | 6/1998 | Fogel ....................................... | 345/427 |
| 5,900,880 | 5/1999 | Cline et al. ............................. | 345/424 |
| 5,933,148 | 8/1999 | Oka et al. ................................ | 345/427 |
| 5,940,079 | 8/1999 | Morino et al. .......................... | 345/419 |
| 5,982,377 | 11/1999 | Yamashita et al. ..................... | 345/427 |

*Primary Examiner*—Phu K. Nguyen
*Assistant Examiner*—Cliff N. Vo
*Attorney, Agent, or Firm*—Limbach & Limbach L.L.P.

[57] ABSTRACT

A circuit for providing a perspective correct transformation of attribute values at positions defining a planar polygon in world space to attribute values at pixels describing the polygon in screen space including a first circuit for determining a series of presetup values defined by coordinates of vertices of the polygon which are constant throughout the polygon, a second circuit for computing setup values for each attribute which are constant throughout the polygon from the presetup values, a third circuit for computing from the setup values for each attribute a result for the attribute which is constant at any pixel describing the polygon, a fourth circuit for determining a reciprocal of a result of a depth attribute computed by the third circuit, and a fifth circuit for combining the values of the result computed by the third circuit for each attribute and the reciprocal value for each pixel of the polygon.

16 Claims, 4 Drawing Sheets

METHOD AND APPARATUS FOR CREATING PERSPECTIVE CORRECT GRAPHICAL IMAGES

BACKGROUND OF THE INVENTION

1. Field of the Invention

This invention relates to computer systems, and more particularly, to methods and apparatus for describing computer output images.

2. History of the Prior Art

In three dimensional graphics, surfaces are typically rendered by assembling a plurality of polygons in a desired shape. The polygons are conventionally triangles because the three vertices of a triangle define a plane in world space which is convenient to describe mathematically. Other polygons restricted to plane surfaces may be similarly described. Such polygons are typically delineated by vertices which are defined by three dimensional coordinates in world space, by color values, by texture coordinates, and the like. The color values define the brightness of each of red/green/blue (r, g, b) colors at each vertex and thus the color at each vertex. The texture coordinates (u, v) define the coordinates of each vertex on a texture map defined by values stored in memory. Such a texture map describes a pattern to be applied to the surface of the triangle to vary the color in accordance with the pattern. The texture coordinates of the vertices of a triangular surface area define the position of the triangle on, and thus addressed into, the texture map. Other characteristics such as transparency, specular color values, and additional textures also define each vertex to provide more sophisticated rendering. In this specification, each of these different values at vertices of the triangle is referred to as an attribute.

Generally, surfaces represented by an assembly of polygons are being viewed in perspective so that the values of most of the attributes provided by an application program are values in world space. However, the three dimensional world space coordinates of the vertices are usually furnished by an application program already transformed into screen coordinates in which horizontal and vertical values (x, y) define screen position and a depth value z determines how near a vertex is to the screen and thus whether that vertex is viewed with respect to other points at the same screen coordinates.

In order to provide the data to be stored in a frame buffer by which a triangle may be drawn on the two dimensional screen, the coordinates furnished by an application program for each vertex must be used to determine screen coordinates of all of the pixels across the entire surface of the polygon at which the various attributes will be determined. Once the pixel positions are determined, the other attributes must be assigned at each pixel position.

If the x and y coordinates are furnished in screen values, then the triangle is positioned in screen space so that all of the pixels defining that triangle are determined. If the x and y coordinates are instead furnished in world coordinates, then the screen vertices of the particular triangle are first determined from the world three dimensional coordinates so that all of the pixels defining that triangle may be determined. This is typically accomplished by a simple conversion process well known to those skilled in the art.

The pixels which describe a particular triangle are typically determined by a series of linear interpolations using the x and y screen coordinates. This process essentially requires dividing the change in the x or the y coordinates between two vertices by the number of pixels between the vertex to determine a per pixel change and incrementing the coordinate by the result for each sequence of coordinates from one vertex to the next. If the edge pixels of the triangle are known, then the coordinates of the pixels on each scan line may be obtained by the interpolation process across from edge to edge across each scan line.

At each pixel position determined, a similar process is typically used by the prior art to determine the value of each of the attributes at the pixel position. However, while the pixel determination is accomplished by linear interpolation in screen space, since the original triangle lies in a plane in world space, the values of each of the attributes varies linearly in world space from one to another of the vertices of the triangle. In order for the attribute values to be reasonably correct at any pixel position on the screen, each of the attributes must be evaluated by linear interpolation in world space and then related back to the pixel position in screen space by a perspective correction process in which the values of the attributes are determined at each screen pixel.

In order to evaluate the values of the many attributes in world space and relate those values back to screen space, a very large amount of computing power is required. Heretofore, the number of steps required to accomplish the computations and the amount of circuitry required have been just too great to allow correct results to be produced. For example, the number of steps required to compute linear values in world space for each of the large number of different attributes is significant. Then, to go through the process of relating each of the values back to screen space through a perspective correction manipulation overwhelms the ability of most computers. Consequently, most prior art graphics circuits merely perform a linear interpolation process in screen on the world space attribute values for each pixel as though the values were screen space values. In many cases, the results produced are not noticeably incorrect. For example, it is difficult to tell what r, g, b color should be at a particular pixel without knowing what the result should look like. Similarly, the fog values which should occur at a particular pixel are difficult to evaluate.

Certain of the attributes produce bizarre results when handled in this manner, however. For example, the application of textures to surfaces is often obviously incorrect even to the untrained eye. For this reason, some prior art graphics processes do evaluate texture coordinates in world space and carry out perspective correction to provide texture coordinates in screen space as each pixel position is computed. However, these processes tend to be quite slow. As to the other attributes, the typical solution is to either ignore the problem or to apply some form of estimated correction to the values as they are generated. In any case, no known graphics circuitry has produce perspective-correct results for all attributes utilized in the process.

Another problem which is encountered in providing perspective correct results using prior art graphics accelerator circuitry derives from the linear interpolation processes used to determine pixel position and attribute values. When a linear interpolation process is used to determine edge coordinates for pixels, the values of those coordinates are not necessarily integrals. Some compromise process such as rounding or truncating is typically used in order to obtain integral values so that actual pixels may be evaluated. However, these processes have all been compromises and the actual values are not provided. Consequently, any scan line of pixels may be off by as much as one full pixel from end to end. When these values are used to determine values for the various attributes, the attribute values similarly lack precision. Moreover, although the values provided for each of the attributes at each vertex are often quite precise, these values are usually not integral values. Consequently, each linear interpolation process used to determine an attribute value produces similar compromises. Consequently, none of the prior art graphics processes produces correct results.

It is desirable to provide apparatus and an improved method for carrying out more rapidly the process of determining the perspective correct screen values of each of the attributes of each pixel defining a polygon.

SUMMARY OF THE INVENTION

These and other objects of the present invention are realized by apparatus and a method which determines the pixels contained within a polygon, computes coefficients of attributes at each pixel utilizing the basic geometric relationship for hyperbolic interpolation, combines the coefficients of the denominator in the geometric relationship in a sequence apart from the setup process and obtains the reciprocal of the value, combines the coefficients of the numerator of the basic geometric relationship for each attribute and stores those coefficients, and combines the coefficients of the numerator and the denominator with pixel coordinates in an operation without division to produce perspective correct attribute values at each pixel.

These and other objects and features of the invention will be better understood by reference to the detailed description which follows taken together with the drawings in which like elements are referred to by like designations throughout the several views.

DETAILED DESCRIPTION

Figure 2:
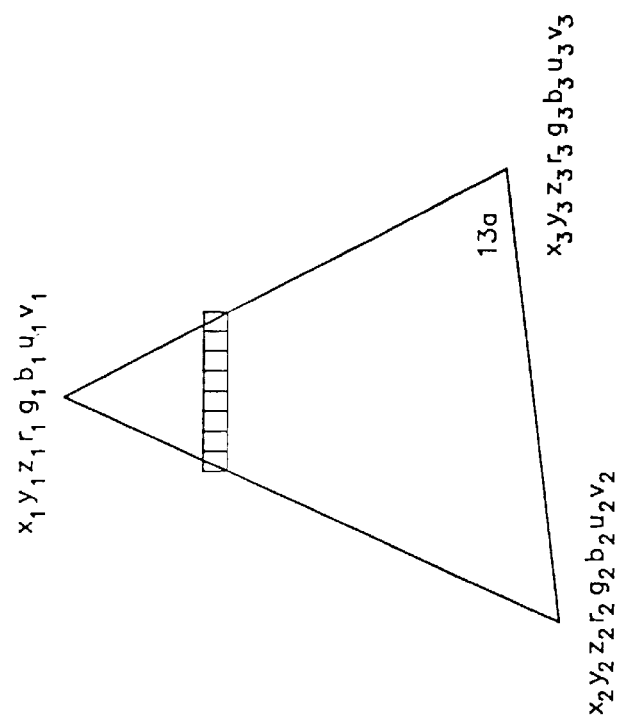
FIG. 2 is an enlargement of the projection on the screen of one of the polygons illustrated in FIG. 1.
Figure 1:
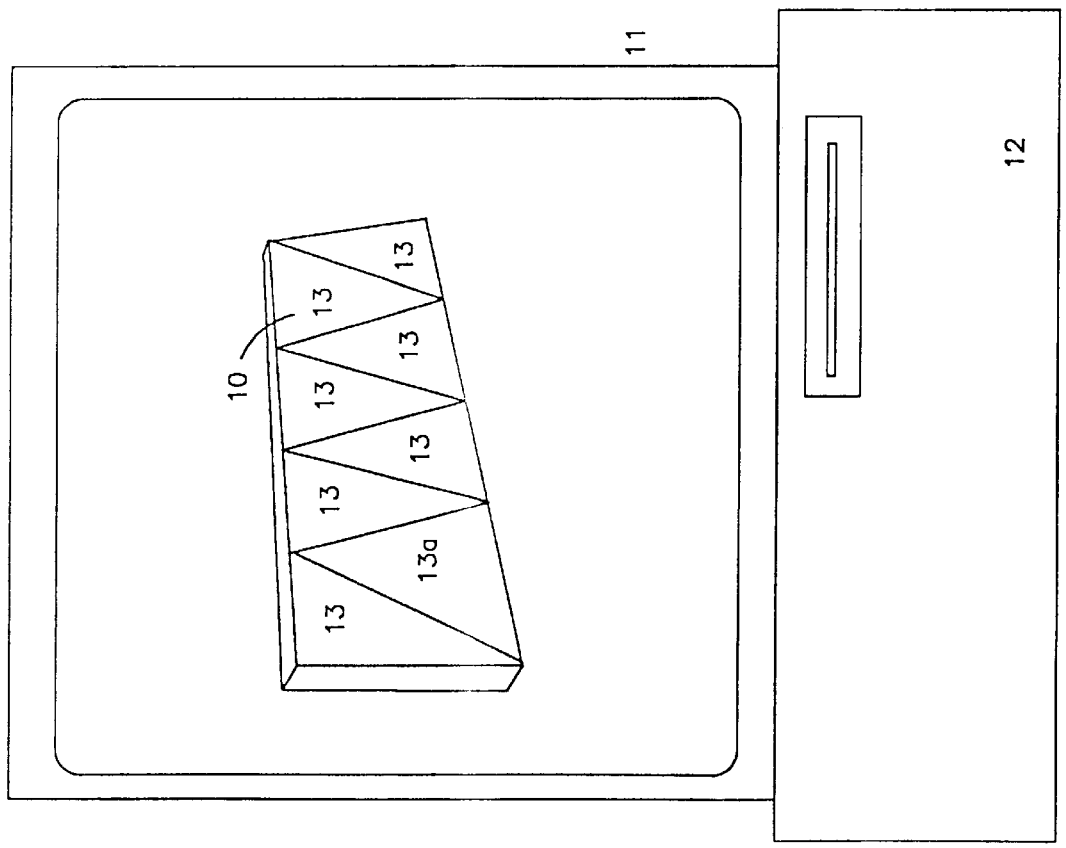
FIG. 1 illustrates a three dimensional object rendered on a computer display utilizing polygons.

FIG. 1 illustrates a three dimensional object having a surface 10 displayed on an output display 11 of a computer 12. The surface 10 is typically described by a plurality of polygons 13 which are usually triangles. The use of a plurality of polygons 13 allows a variegated surface to be described by relatively simple approximations of individual areas of the surface 10. The screen projection of one of these polygons 13a (also referred to as triangle 13a) has been enlarged in FIG. 2 in order to illustrate the manner in which it and the other polygons are to be rendered in order to produce the surface 10.

It will be assumed for the purpose of this specification, that the surface 10 is some form of three-dimensional multicolored textured surface. As may be seen, the triangle 13a which is a part of the surface 10 includes the usual three vertices each of which is usually defined by screen coordinates x, y, z; color values r, g, b; and texture coordinates u, v. The x, y, and z values assigned by an application program may define the position of each vertex in some general world space. If so, in order to provide the data to be stored in a frame buffer by which a triangle 13a may be drawn on the screen, the x and y world space coordinates should be translated to screen space by a perspective transformation process so that each vertex is positioned at some x distance along a horizontal screen axis and some y distance along a vertical screen axis.

The equations for conversion are:

$Xs=(H/S)*(X/Z);$ /* −1.0 to 1.0 */

$Ys=(H/S)*(Y/Z);$ /* −1.0 to 1.0 */

$M=(H/S)*(1/Z);$ /* 1/S to H/S/F */ where, H is the distance from the viewer to the center of the screen; S is half of either the width or height of the screen; F is the distance from the eye to the far clip plane, and the field of view in degrees is 2*arctangent (S/H).

Alternatively, x, y, and z values may be furnished in screen space and require no translation.

In order to provide the data to be stored in a frame buffer by which a triangle 13a may be drawn on the screen, the screen coordinates of the vertices of the particular triangle are used to determine all of the pixels defining the triangle. The attribute values are then determined for each of the pixels which define the triangle. In one embodiment of the invention, attribute values are determined at each pixel for r, g, b colors; specular r, g, b colors; two different sets of u and v texture coordinates; alpha; and fog. In all, more than ten attributes are evaluated in the particular embodiment. Other attributes may also be evaluated in the same manner as described in this specification.

The typical manner of determining which pixels constitute a triangle is to linearly interpolate the x and y screen coordinates at the vertices to determine the edge pixels of the triangle and then linearly interpolate the x and y coordinates the edge pixel values obtained to determine those pixels on each scan line. The present invention may utilize this or some other method of determining the pixels in a triangle. However, in contrast to the prior art, the present invention does not utilize non-integral values determined by through these interpolations to determine the values of the various attributes. Instead, the present invention merely identifies pixels defining the triangle by this process and thereafter utilizes integral pixel coordinate values to determine attribute screen values.

Rather than attempting the known processes by which attribute values are determined at each pixel, the present invention is based on a more complete understanding of the entire process by which linear interpolation would normally be practiced on the individual attribute values in world space and the results manipulated by a perspective transformation process to provide screen values for each attribute.

Figure 3:
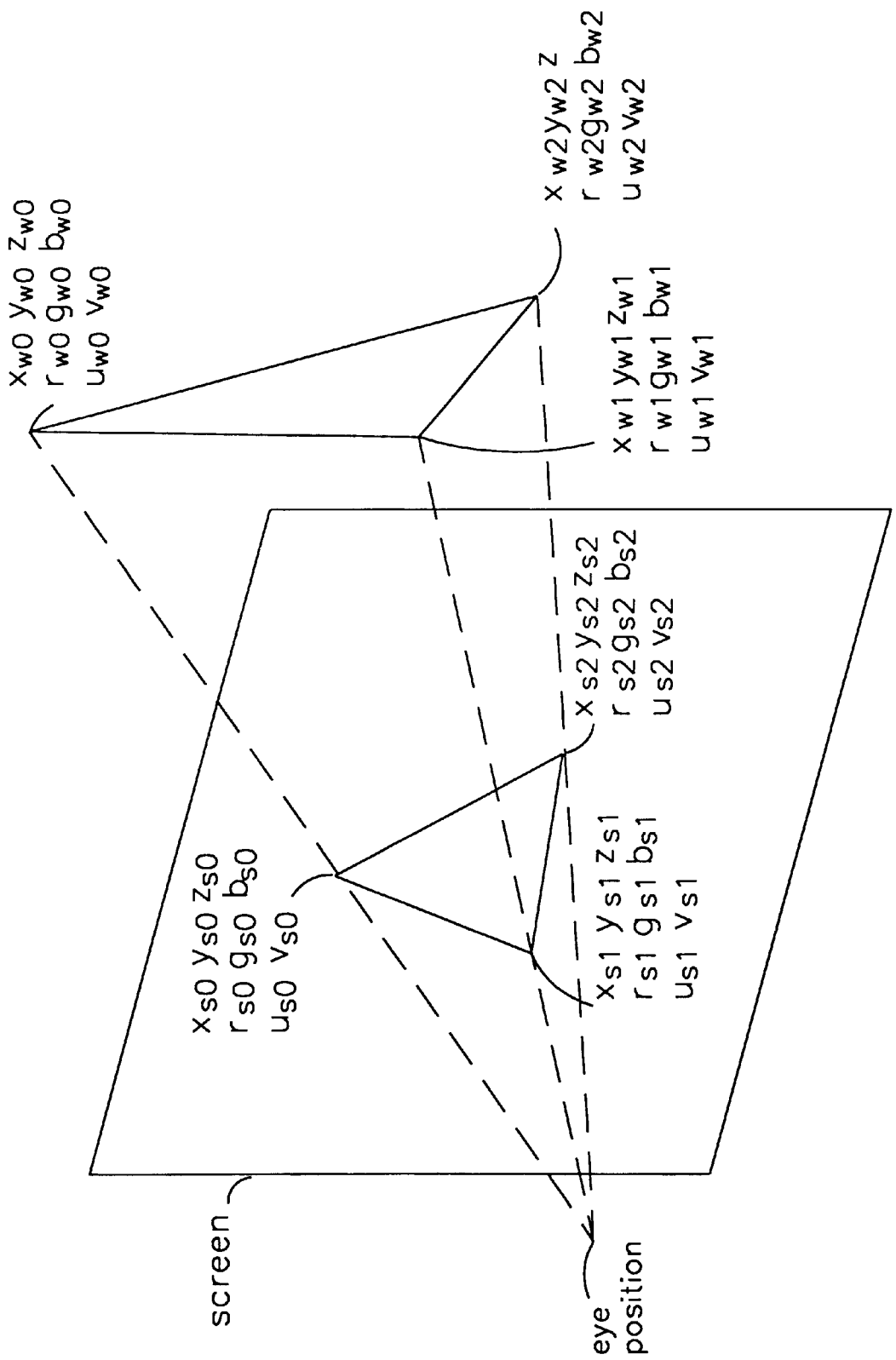
FIG. 3 illustrates the mapping of a polygon such as that illustrated in FIGS. 1 and 2 onto a world space surface.

FIG. 3 illustrates how a single pixel is projected onto a texture map. Visualizing the manner in which this occurs will help in understanding the method of the present invention to determine attribute values.

The entire process of mathematically computing perspective correct screen space values for the attributes from world space vertex values is referred to as hyperbolic interpolation and has been expressed in the geometric relationship as follows:

$E_s=(aX+bY+c)/(dX+eY+f),$ where $E_s$ is the screen value of the particular attribute at the pixel defined by the X Y coordinates; and a, b, c, d, e, and f are constants over the triangle which depend on various dimensions of the triangle in screen and world space and the values of the attributes at the vertices in world space.

This relationship incorporates both the determination of world space values for the various attributes and the translations to provide perspective correction to those values to produce screen attribute values.

Essentially, the process to carry out the algorithm requires the steps described above to determine the screen x, y, and z coordinates of each of the pixels forming the triangle in screen space. Once the a, b, c, d, e, and f values for each of the attributes are determined, the numerator and denominator are calculated. Then the numerator is divided by the denominator for each attribute. Although the relationship appears somewhat benign at first glance, it masks a very large series of computations which require an inordinate amount of manipulation to produce a result. Carrying out the basic algorithm is extremely compute intensive, so intensive that to date there have been no functioning hardware units produced commercially.

The reason for this is that at each pixel on the screen which describes the triangle, the process computes the numerator and the denominator for the relationship for the particular pixel for each of the particular attributes and then divides the numerator by the denominator to determine the value of the particular attribute at the pixel. The values of each of the attributes for the pixel are then placed into the rendering pipeline and used to modify the pixel color during the rendering process.

As has been pointed out, to date no hardware mechanism has been devised which is capable of carrying out the algorithm in a commercial computer although it is certainly possible to carry out the algorithm in software rapidly enough to provide accurate displays with extremely powerful computers. However such computers are found in laboratories and are generally unavailable to those interested in running commercial software.

However, it has been found that by providing circuitry which reorganizes the operations utilized in carrying out the algorithms, the time for carrying out the various elements may be drastically shortened. In fact, embodiments have been devised which reduce the time required to carry out each individual determination of an attribute value to a period which is less than one-tenth that required to carry out the algorithm in accordance with the teachings of the prior art. Moreover, it has been found that various embodiments of the invention may be utilized to provide results which emphasize the speed of the operation or the precision of the operation for all or any of the attributes.

The invention is based on the analysis of the geometry by which accurate perspective translations from world space to screen space may take place. This analysis is used to determine which operations limit the speed and precision of the computations which are necessary. The results of the determination allow the operations which provide the computations to be ordered and undertaken in such a manner that rapid perspective correct translations of attributes are produced. For example, the circuitry divides the process into one sequence which provides initial values from which coefficients may be determined for coordinates which determine each attribute at each pixel; a sequence which combines the initial values obtained with attribute values furnished at the vertices to provide some coefficient values for each attribute and other coefficient values for the entire triangle; a sequence which separately combines those coefficients normally used in a divisor with individual pixel coordinates and provides a reciprocal for the resulting value; and a sequence which combines the coefficient values for each attribute at each pixel and multiplies the result by the reciprocal. Combining steps provided in each of the attribute determinations and eliminating the division process from the all steps by which the values are set up alone accelerates the determination by a power of ten.

A number of specific embodiments implement the process in such a way that specific results may be enhanced.

There are a myriad of sequences in which the steps of the process which compute results for the basic relationship may be implemented. Before the present invention, the sequences selected have not produced precise results rapidly enough to allow hardware implementation. One specific sequence of operations in accordance with the invention which provide accurate perspective translations rapidly from world space to screen space for a number of attributes when the values X and Y in the basic formula are screen values are as follows:

Where:

A, B, C, D, E, F are the coefficients of the basic relationship

Xs0, Xs1, Xs2 Screen Coordinates of vertices

Ys0, Ys1, Ys2 Screen Coordinates of vertices

Zs0, Zs1, Zs2 Screen Z Buffer Coordinates of vertices

M0, M1, M2 Screen Z Buffer Coordinates of vertices

R0, R1, R2 World Red Lighting of vertices

G0, G1, G2 World Green Lighting of vertices

B0, B1, B2 World Blue Lighting of vertices

F0, F1, F2 World Fog of vertices

U0, U1, U2 Texture Coordinates of vertices

V0, V1, V2 Texture Coordinates of vertices

Input: Xs, Ys Screen Coordinates of pixels

---

Triangle Presetup ad0 = Ys1−Ys2;
ad1 = Ys2−Ys0;
ad2 = Ys0−Ys1;
be0 = Xs2−Xs1;
be1 = Xs0−Xs2;
be2 = Xs1−Xs0;
cf0 = psu0−psu1;
cf1 = psu2−psu3;
cf2 = psu4−psu5;
psu0 = Xs1*Ys2;
psu1 = Xs2*Ys1;
psu2 = Xs2*Ys0;
psu3 = Xs0*Ys2;
psu4 = Xs0*Ys1;
psu5 = Xs1*Ys0;
adm0 = ad0*M0;
adm1 = ad1*M1;
adm2 = ad2*M2;
bem0 = be0*M0;
bem1 = be1*M1;
bem2 = be2*M2;
cfm0 = cf0*M0;
cfm1 = cf1*M1;
cfm2 = cf2*M2.

Triangle Setup

D = adm0 + adm1 + adm2;
E = bem0 + bem1 + bem2;
F = cfm0 + cfm1 + cfm2;
Zz = cf0 + cf1 + cf2;
Az = ad0*Zs0 + ad1*Zs1 + ad2*Zs2;
Bz = be0*Zs0 + be1*Zs1 + be2*Zs2;
Cz = cf0*Zs0 + cf1*Zs1 + cf2*Zs2;
Au = adm0*U0 + adm1*U1 + adm2*U2;

-continued

```
Bu = bem0*U0 + bem1*U1 + bem2*U2;
Cu = cfm0*U0 + cfm1*U1 + cfm2*U2;
Av = adm0*V0 + adm1*V1 + adm2*V2;
Bv = bem0*V0 + bem1*V1 + bem2*V2;
Cv = cfm0*V0 + cfm1*V1 + cfm2*V2;
Ar = adm0*R0 + adm1*R1 + adm2*R2;
Br = bem0*R0 + bem1*R1 + bem2*R2;
Cr = cfm0*R0 + cfm1*R1 + cfm2*R2;
Ag = adm0*G0 + adm1*G1 + adm2*G2;
Bg = bem0*G0 + bem1*G1 + bem2*G2;
Cg = cfm0*G0 + cfm1*G1 + cfm2*G2;
Ab = adm0*B0 + adm1*B1 + adm2*B2;
Bb = bem0*B0 + bem1*B1 + bem2*B2;
Cb = cfm0*B0 + cfm1*B1 + cfm2*B2;
Af = adm0*F0 + adm1*F1 + adm2*F2;
Bf = bem0*F0 + bem1*F1 + bem2*F2;
Cf = cfm0*F0 + cfm1*F1 + cfm2*F2;
Per Pixel operations:

Dd = D *Xs + E *Ys + F;
Zn = (Az*Xs + Bz*Ys + Cz)/Zz;  /*screen*/
Zn = (              Zz)/Dd;  /*world*/
Un = (Au*Xs + Bu*Ys + Cu)/Dd;
Vn = (Av*Xs + Bv*Ys + Cv)/Dd;
Rn = (Ar*Xs + Br*Ys + Cr)/Dd;
Gn = (Ag*Xs + Bg*Ys + Cg)/Dd;
Bn = (Ab*Xs + Bb*Ys + Cb)/Dd;
Fn = (Af*Xs + Bf*Ys + Cf)/Dd;
```

Although prior art arrangements for carrying out the basic relationship have been extremely compute intensive, the above-described sequences, allow modifications to the process by which it may be made very rapid.

For example, it may be determined from the sequences above that for any individual attribute, the values a, b, and c depend only on the x, y, and z values of the three vertices in screen space and on the values of the attributes at the three vertices in world space. Consequently, these values a, b, and c may be determined once for each attribute and remain constant for that attribute throughout the triangle. Similarly, the d, e, and f values depend only on the x, y, and z values of the three vertices in screen space. Consequently, these values remain constant for each operation throughout the triangle.

With this realization, circuitry may be devised to compute and store these values for each triangle at the beginning of the process for determining attribute values in screen space. Once these values have been determined, the x and y screen values of each pixel are used to carry out the steps.

This, of itself, still produces an inordinately long process to determine each attribute value at each pixel. We have reduced the process substantially by eliminating the need to provide a divide operation to compute each attribute value during the setup operation. Instead, the invention removes the division process from the setup procedure entirely. First the invention provides circuitry which computes the values of d, e, and f only once for each triangle. Then at each pixel, circuitry computes from these values a denominator and a reciprocal of the denominator. This reciprocal is stored and used to compute each screen space attribute value at that pixel.

As the d, e, and f values are being computed, the triangle values a, b, and c are determined and stored for each attribute. Then, the a, b, and c values for each attribute at each pixel are determined by multiplying by the pixel coordinates. The results are added and multiplied by the reciprocal of the denominator once for each attribute at each pixel.

Figure 4:
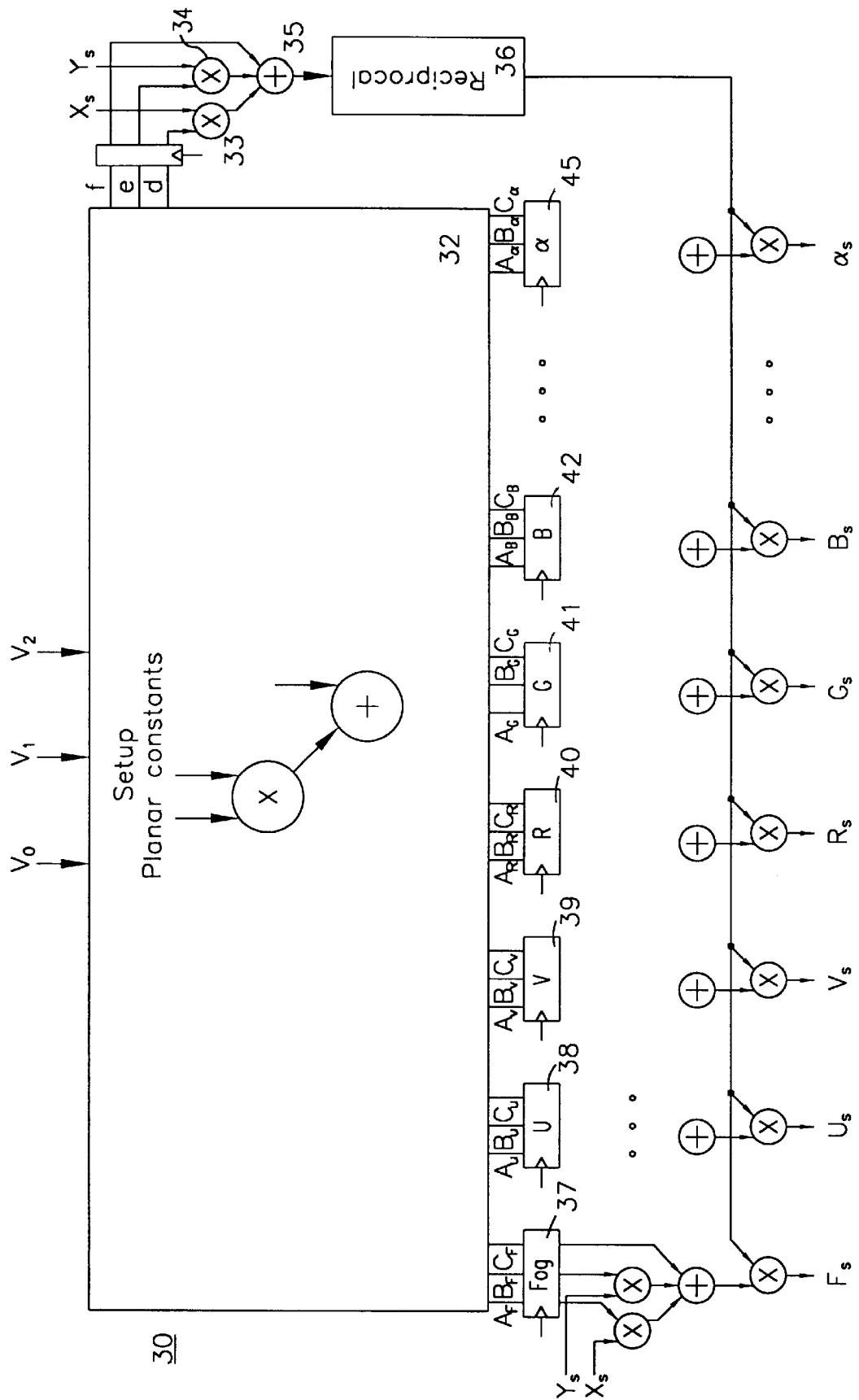
FIG. 4 is a block diagram of one embodiment of circuitry which is a part of the computer of FIG. 4 and is used to carry out the invention.

FIG. 4 is a block diagram of a circuit 30 which may be used to carry out the invention. The circuit 30 includes a setup portion 32 in which circuitry for determining the constant values a, b, c, d, e, and f resides. The circuit 30 receives as input values the values at the three vertices of the triangle in terms of the screen coordinates of x, y, z, and m (a scaled reciprocal of z defined above) and the world coordinates of the various attributes such as r, g, b, u, v, fog, spectral colors, and others. The circuit 30 carries out the functions described by the sequences above to determine the various sub-elements which make up the constants. More particularly, the circuitry may accomplish the series of functions delineated by the relationships:

```
ad0 = Ys1–Ys2;
ad1 = Ys2–Ys0;
ad2 = Ys0–Ys1;
be0 = Xs2–Xs1;
be1 = Xs0–Xs2;
be2 = Xs1–Xs0;
cf0 = psu0–psu1;
cf1 = psu2–psu3;
cf2 = psu4–psu5;
psu0 = Xs1*Ys2;
psu1 = Xs2*Ys1;
psu2 = Xs2*Ys0;
psu3 = Xs0*Ys2;
psu4 = Xs0*Ys1;
psu5 = Xs1*Ys0;
adm0 = ad0*M0;
adm1 = ad1*M1;
adm2 = ad2*M2;
bem0 = be0*M0;
bem1 = be1*M1;
bem2 = be2*M2;
cfm0 = cf0*M0;
cfm1 = cf1*M1;
cfm2 = cf2*M2;
```

These operations are carried out in one embodiment by a series of gates designed in a manner well known to those skilled in the art which require sixteen cycles to accomplish fifteen multiplications and nine subtractions. For example, the adm0 value results from multiplying the M0 value (screen scaled depth factor) by the difference between the y screen coordinates at two of the vertices.

The results of these sub-elements may be combined in accordance with the following relationships in one embodiment which utilize another series of gates to carry out the functions of setting up the triangle values:

```
D = adm0 + adm1 + adm2;
E = bem0 + bem1 + bem2;
F = cfm0 + cfm1 + cfm2;
Zz = cf0 + cf1 + cf2;
Az = ad0*Zs0 + ad1*Zs1 + ad2*Zs2;
Bz = be0*Zs0 + be1*Zs1 + be2*Zs2;
Cz = cf0*Zs0 + cf1*Zs1 + cf2*Zs2;
Au = adm0*U0 + adm1*U1 + adm2*U2;
Bu = bem0*U0 + bem1*U1 + bem2*U2;
Cu = cfm0*U0 + cfm1*U1 + cfm2*U2;
Av = adm0*V0 + adm1*V1 + adm2*V2;
Bv = bem0*V0 + bem1*V1 + bem2*V2;
Cv = cfm0*V0 + cfm1*V1 + cfm2*V2;
Ar = adm0*R0 + adm1*R1 + adm2*R2;
Br = bem0*R0 + bem1*R1 + bem2*R2;
Cr = cfm0*R0 + cfm1*R1 + cfm2*R2;
Ag = adm0*G0 + adm1*G1 + adm2*G2;
Bg = bem0*G0 + bem1*G1 + bem2*G2;
Cg = cfm0*G0 + cfm1*G1 + cfm2*G2;
Ab = adm0*B0 + adm1*B1 + adm2*B2;
Bb = bem0*B0 + bem1*B1 + bem2*B2;
Cb = cfm0*B0 + cfm1*B1 + cfm2*B2;
```

-continued $$Af = adm0*F0 + adm1*F1 + adm2*F2;$$
$$Bf = bem0*F0 + bem1*F1 + bem2*F2;$$
$$Cf = cfm0*F0 + cfm1*F1 + cfm2*F2;$$

In a particular embodiment, a series of gates designated by these relationships require twelve cycles to accomplish nine multiplications and six additions for each attribute.

The d, e, and f values are each determined in the setup circuitry 32 by adder circuits which combines the result of the sub-element functions. These values are transferred to a series of gates 33–35 which are used to multiply the d and e values by the screen x and y coordinates of the particular pixel and add the results with the f value to obtain the denominator of the basic relationship. The value produced is transferred to a reciprocal circuit 36.

The reciprocal circuit 36 accomplishes the only division required in the entire process, a once per pixel determination of the reciprocal of the result produced at the adder 35. In one embodiment, this requires nine stages of gates with two subtractions and two multiplications per stage.

The a, b, and c coefficients for each of the attributes are obtained in one embodiment within the setup circuit 32 by series of gates which multiply the values at the vertices for each of the attributes by the sub-elements determine as explained above and add the results in accordance with the above relationships. The results determined within the circuit 32 are transferred to a series of latches 37–45 each of which stores the results for the particular attribute. The circuit 30 illustrates latches storing values for fog, u, v, r, g, and b, respectively. The actual number of latches depends on the number of attributes produced by the particular embodiment.

The results realized for each of the attributes and stored in the latches 37–45 and the reciprocal value stored by the circuit 36 are then combined for each of the attributes by a final series of gates which multiply the attribute a and b values by the screen coordinates of the particular pixel, add those together with the c value and multiply the result by the reciprocal to produce the exact perspective-correct screen value for the attribute at that pixel.

Utilizing the circuitry described, the results are reached in numbers of cycles which are less than one-tenth that of the prior art. The result reached are exact and perspective correct for each of the attributes, a result that has never been reached in hardware.

Moreover, the present invention produces results which allow the attribute values at any particular point to be determined independently of any other pixels to be displayed. That is, a particular pixel may be displayed randomly without having to step through all of the other pixel position in a sequence leading to that pixel as was required by the prior art.

Another advantage of the invention is the ability to provide a pixel whether in a plus or minus direction in any order rather than in a particular sequence. This particular advantage is related to another advantage of the invention where pixels are provided in sequence in either a plus or minus direction horizontally or vertically. In each of these cases in which either the screen x or y value remains constant, the steps required to determine attributes from one pixel to the next require only that a single term in each of the numerator and the denominator of the basic relationship be computed, added to or subtracted from the values computed for the last pixel, the reciprocal recomputed, and the two values multiplied together. Thus, if attributes for an adjacent pixel on the same scan line are computed, A and D values are multiplied by the change in the Xs value for the pixel. Where the new pixel is one pixel away, the change is merely one. Consequently, all that needs to be done is to add the values A and D to the values at the last position and recompute the reciprocal. If the pixel is in a positive position related to the last, the new values are added to the numerator and denominator values; if the pixel is in a negative position related to the last, the new values are subtracted from the numerator and denominator values. Similarly, if attributes for a vertically adjacent pixel are determined, B and E values are multiplied by the change in the Ys value for the pixel, added to or subtracted from the numerator and denominator values depending on the direction or the new pixel, and the remainder of the steps followed. This removes a number of steps from the computation and significantly accelerates the operation. Moreover, it may be accomplished utilizing the existing circuitry which provides the appropriate adders, subtractors, and multipliers to accomplish these enhanced results.

In addition, the invention produces correct results for pixels which lie outside the particular triangle for which vertices are provided in accordance with the vertices provided, a result which has not been provided in any hardware.

A great advantage of the invention is the accuracy of the results produced, they are simply correct and do not require corrections for non- integral portions of values produced in reaching results. The pixel positions at which each of the sub-elements and elements of the attributes screen values are determined are exact pixel positions which require no correction.

Three other series of relationships provide similar results. These sets of relationships are as follows:

Second set:

The second set of relationships uses the same definitions, receives the same input values, and proceeds through the same presetup steps. The second set differs from the first set, however, in the steps of the triangle setup and in the operations carried out for each pixel.

The steps which differ are as follows:

Triangle Setup (8 cycles, 6 multiplications, 3 adds, 2 subtractions)

$$Zz = cf0 + cf1 + cf2;$$
$$D = adm0 + adm1 + adm2;$$
$$E = bem0 + bem1 + bem2;$$
$$F = cfm0 + cfm1 + cfm2;$$
$$Zs10 = Zs1 - Zs0;$$
$$Zs20 = Zs2 - Zs0;$$
$$Az = ad1*Zs10 + ad2*Zs20;$$
$$Bz = be1*Zs10 + be2*Zs20;$$
$$Cz = cf1*Zs10 + cf2*Zs20;$$
$$U10 = U1 - U0;$$
$$U20 = U2 - U0;$$
$$Au = adm1*U10 + adm2*U20;$$
$$Bu = bem1*U10 + bem2*U20;$$
$$Cu = cfm1*U10 + cfm2*U20;$$
$$V10 = V1 - V0;$$
$$V20 = V2 - V0;$$
$$Av = adm1*V10 + adm2*V20;$$
$$Bv = bem1*V10 + bem2*V20;$$
$$Cv = cfm1*V10 + cfm2*V20;$$
$$R10 = R1 - R0;$$
$$R20 = R2 - R0;$$
$$Ar = adm1*R10 + adm2*R20;$$
$$Br = bem1*R10 + bem2*R20;$$
$$Cr = cfm1*R10 + cfm2*R20;$$

-continued

```
G10 = G1 - G0;
G20 = G2 - G0;
Ag = adm1*G10 + adm2*G20;
Bg = bem1*G10 + bem2*G20;
Cg = cfm1*G10 + cfm2*G20;
B10 = B1 - B0;
B20 = B2 - B0;
Ab = adm1*B10 + adm2*B20;
Bb = bem1*B10 + bem2*B20;
Cb = cfm1*B10 + cfm2*B20;
F10 = F1 - F0;
F20 = F2 - F0;
Af = adm1*F10 + adm2*F20;
Bf = bem1*F10 + bem2*F20;
Cf = cfm1*F10 + cfm2*F20;
```
Per pixel operations

```
Dd = D *Xs + E *Ys + F;
Zn = Zs0 + (Az*Xs + Bz*Ys + Cz)/Zz;  /*screen*/
Zn =        (                   Zz)/Dd; /*world*/
Un = U0 + (Au*Xs + Bu*Ys + Cu)/Dd;
Vn = V0 + (Av*Xs + Bv*Ys + Cv)/Dd;
Rn = R0 + (Ar*Xs + Br*Ys + Cr)/Dd;
Gn = G0 + (Ag*Xs + Bg*Ys + Cg)/Dd;
Bn = B0 + (Ab*Xs + Bb*Ys + Cb)/Dd;
Fn = F0 + (Af*Xs + Bf*Ys + Cf)/Dd.
```

The differences between the various operations provided by the first and second sets of relationships reside in the arrangement of gates to provide certain functions in different orders. The order in which the sequences are carried out determines the speed of operation, the number of gates and thus the complexity of the operation, and the precision of the results produced by the operation.

More particularly, it will been seen that the gating functions described in the first set and the second set differ from each other in triangle setup sequence and the per pixel operations. Once the presetup values have been determined by subtracting screen space coordinates from one another, the first embodiment determines the coefficients for each of the values of the base algorithm by multiplying the presetup values together and adding the results of the multiplications. The second embodiment, on the other hand, relates attribute values at two of the vertices to attribute values at the third vertex by subtracting the particular attribute value to which the others are related before determining each of the coefficients in the triangle setup operations. This has the effect of providing setup values relative to a vertex rather than in absolute space. For that reason, these operations are referred to as absolute and relative operations. For example:

U10=U1-U0;

U20=U2-U0.

This has the effect of reducing the number of gates required to reach each of the coefficients by the number of gates necessary to accomplish one multiply and one add operation. Then, at each pixel determination, the original relationship is restored by gates which move the origin to its proper position.

The effect of these changes is to reduce the number of gates in the second embodiment and cause the operation to execute more rapidly. Another effect is to make the operation of the second embodiment more precise than that of the first embodiment.

The third and forth embodiments of gating operations defined by the relationships which follow accomplish changes which affect the speed and precision of the operations in a similar manner. The third embodiment, for example, treats one of the vertices in screen space as the origin of the triangle setup relationships by subtracting the value of the particular presetup value at the vertex to be used as the origin from the presetup value at the other vertices for each portion of the operation. This has the effect of providing values relative to a new origin rather than in absolute space. The fourth embodiment treats one of the vertices in screen space as the origin and also treats one of the vertices in world space as the origin. This has the effect of determining values relative to two new origins rather than in absolute space. These embodiments utilize a number of presetup gates and operations required to provide their different precision and speed.

Third set

The third set of relationships uses the same definitions and receives the same input values. The third set differs from the first set, however, in the presetup steps, the steps of the triangle setup, and in the operations carried out for each pixel.

The steps which differ are as follows:

Triangle Presetup (12 cycles,
9 multiplications, 7 subtractions)

```
be2 = Xs1 -Xs0;
ad1 = Ys2 -Ys0;
be1 = Xs0 -Xs2;
ad2 = Ys0 -Ys1;
ad0 = Ys1 -Ys2;
be0 = Xs2 -Xs1;
cf0 = psu0-psu1;
bem2 = be2*M2;
psu0 = be2*ad1;
adm1 = ad1*M1;
psu1 = be1*ad2;
adm0 = ad0*M0;
adm2 = ad2*M2;
bem0 = be0*M0;
bem1 = be1*M1;
cfm0 = cf0*M0.
```
Triangle Setup (9 cycles,
9 multiplications, 4 additions)

```
Zz = cf0;
D = adm0 + adm1 + adm2;
E = bem0 + bem1 + bem2;
F = cfm0;
Az = ad0*Zs0 + ad1*Zs1 + ad2*Zs2;
Bz = be0*Zs0 + be1*Zs1 + be2*Zs2;
Cz = cf0*Zs0;
Au = adm0*U0 + adm1*U1 + adm2*U2;
Bu = bem0*U0 + bem1*U1 + bem2*U2;
Cu = cfm0*U0;
Av = adm0*V0 + adm1*V1 + adm2*V2;
Bv = bem0*V0 + bem1*V1 + bem2*V2;
Cv = cfm0*V0;
Ar = adm0*R0 + adm1*R1 + adm2*R2;
Br = bem0*R0 + bem1*R1 + bem2*R2;
Cr = cfm0*R0;
Ag = adm0*G0 + adm1*G1 + adm2*G2;
Bg = bem0*G0 + bem1*G1 + bem2*G2;
Cg = cfm0*G0;
Ab = adm0*B0 + adm1*B1 + adm2*B2;
Bb = bem0*B0 + bem1*B1 + bem2*B2;
Cb = cfm0*B0;
Af = adm0*F0 + adm1*F1 + adm2*F2;
Bf = bem0*F0 + bem1*F1 + bem2*F2;
Cf = cfm0*F0.
```
Per Pixel operations

```
Dd = D * (Xs-Xs0) + E * (Ys-Xs0) + F;
Zn = (Az* (Xs-Xs0) + Bz* (Ys-Xs0) + Cz)/Zz;  /*screen Z*/
Zn = (                               Zz)/Dd; /*world Z*/
Un = (Au* (Xs-Xs0) + Bu* (Ys-Xs0) + Cu)/Dd;
Vn = (Av* (Xs-Xs0) + Bv* (Ys-Xs0) + Cv)/Dd;
```

-continued

Rn = (Ar* (Xs-Xs0) + Br* (Ys-Xs0) + Cr)/Dd;
Gn = (Ag* (Xs-Xs0) + Bg* (Ys-Xs0) + Cg)/Dd;
Bn = (Ab* (Xs-Xs0) + Bb* (Ys-Xs0) + Cb)/Dd;
Fn = (Af* (Xs-Xs0) + Bf* (Ys-Xs0) + Cf)/Dd.

Fourth set

The fourth set of relationships uses the same definitions, receives the same input values and goes through the same presetup steps as the third set of relationships. The fourth set differs from the third set, however, in the steps of the triangle setup, and in the operations carried out for each pixel.

The steps which differ from the third are as follows:

Triangle Presetup (12 cycles,
9 multiplications, 7 subtractions)

be2 = Xs1-Xs0;
ad1 = Ys2-Ys0;
be1 = Xs0-Xs2;
ad2 = Ys0-Ys1;
ad0 = Ys1-Ys2;
be0 = Xs2-Xs1;
cf0 = psu0-psu1;
bem2 = be2*M2;
psu0 = be2*ad1;
adm1 = ad1*M1;
psu1 = be1*ad2;
adm0 = ad0*M0;
adm2 = ad2*M2;
bem0 = be0*M0;
bem1 = be1*M1;
cfm0 = cf0*M0.

Triangle Setup (9 cycles,
4 multiplications, 2 subtractions, 2 additions)

Zz = cf0;
D = adm0 + adm1 + adm2;
E = bem0 + bem1 + bem2;
F = cfm0;
Zs10 = Zs1 - Zs0;
Zs20 = Zs2 - Zs0;
Az =          ad1*Zs10 + ad2*Zs20;
Bz =          be1*Zs10 + be2*Zs20;
U10 = U1 - U0;
U20 = U2 - U0;
Au =          adm1*U10 + adm2*U20;
Bu =          bem1*U10 + bem2*U20;
V10 = V1 - V0;
V20 = V2 - V0;
Av =          adm1*V10 + adm2*V20;
Bv =          bem1*V10 + bem2*V20;
R10 = R1 - R0;
R20 = R2 - R0;
Ar =          adm1*R10 + adm2*R20;
Br =          bem1*R10 + bem2*R20;
G10 = G1 - G0;
G20 = G2 - G0;
Ag =          adm1*G10 + adm2*G20;
Bg =          bem1*G10 + bem2*G20;
B10 = B1 - B0;
B20 = B2 - B0;
Ab =          adm1*B10 + adm2*B20;
Bb =          bem1*B10 + bem2*B20;
F10 = F1 - F0;
F20 = F2 - F0;
Af =          adm1*F10 + adm2*F20;
Bf =          bem1*F10 + bem2*F20.

Per Pixel operations

Dd =       D * (Xs-Xs0) + E * (Ys-Xs0) + F;
Zn = Zs0 + (Az* (Xs-Xs0) + Bz* (Ys-Xs0)     )/Zz; /*screen Z*/
Zn =       (                          Zz)/Dd; /*world Z*/
Un = U0 + (Au* (Xs-Xs0) + Bu* (Ys-Xs0)     )/Dd;
Vn = V0 + (Av* (Xs-Xs0) + Bv* (Ys-Xs0)     )/Dd;

-continued

Rn = R0 + (Ar* (Xs-Xs0) + Br* (Ys-Xs0)     )/Dd;
Gn = G0 + (Ag* (Xs-Xs0) + Bg* (Ys-Xs0)     )/Dd;
Bn = B0 + (Ab* (Xs-Xs0) + Bb* (Ys-Xs0)     )/Dd;
Fn = F0 + (Af* (Xs-Xs0) + Bf* (Ys-Xs0)     )/Dd.

Four other methods for accomplishing the same determination of attribute values in accordance with the invention utilize the x, y, and z input values at the vertices in world space rather than in screen space in accordance with the perspective transformation algorithms:

$Xs=(H/S)*(X/Z),$ $Ys=(H/S)*(Y/Z),$ $M=(H/S)*(1/Z),$ described above. This causes a reorganization of the gating in accordance with the transformation. The particular relationships which define the gating arrangements may be easily determined by those skilled in the art. As may be seen, the different embodiments are various combinations in which absolute or relative attribute values and absolute or relative screen coordinate values are utilized to select the precision and speed of the operation.

Figure 5:
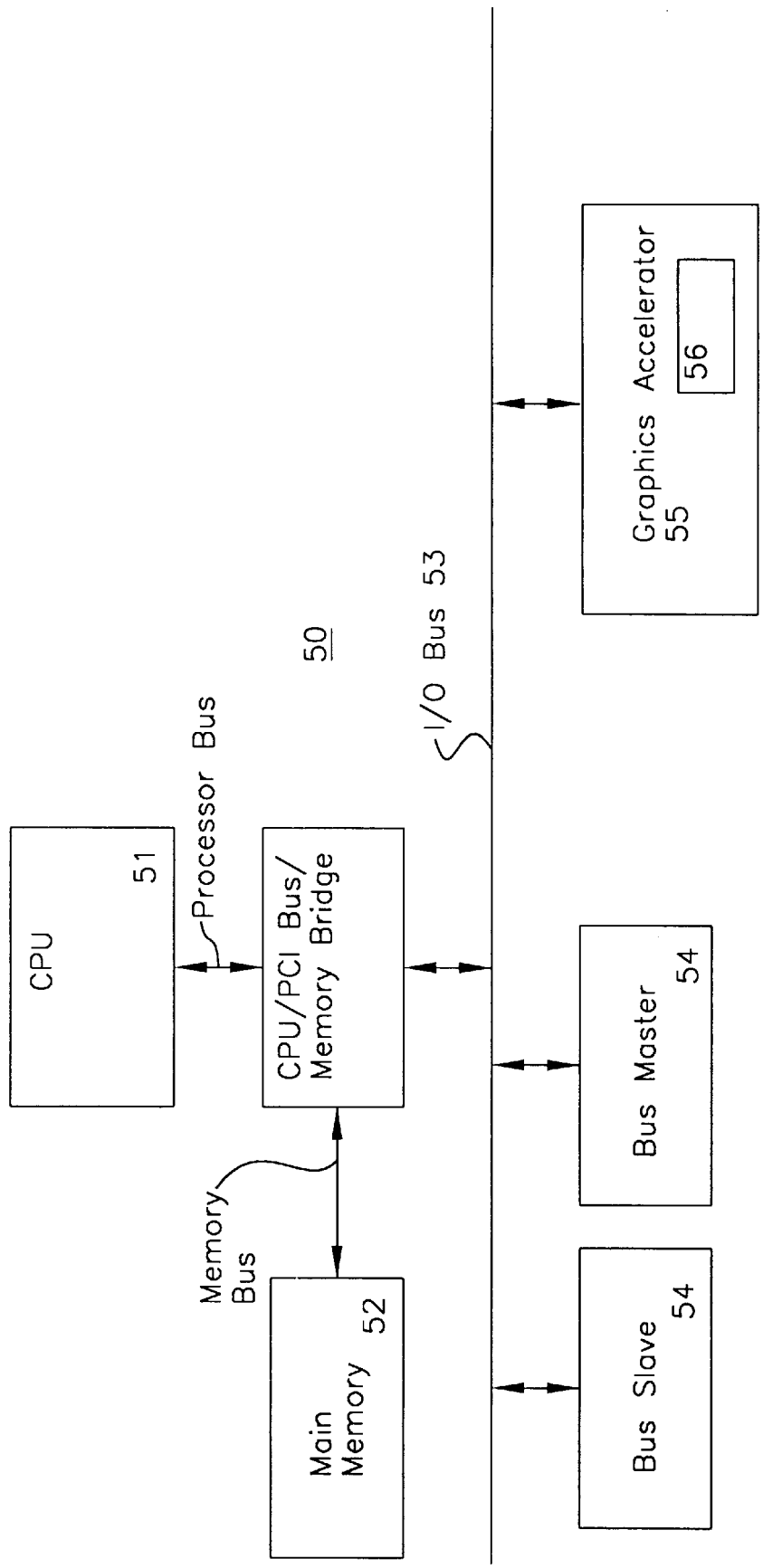
FIG. 5 is a block diagram of a computer for carrying out the present invention.

FIG. 5 is a block diagram illustrating a computer 50 utilizing the features of the present invention. The computer 50 includes a central processing unit 51, main memory 52, system input/output (I/O) bus 53, and various I/O devices 54 and 55. The I/O device 55 is a graphics accelerator designed in accordance with the present invention to speed the transfer of graphics data from the central processing unit 51 to the device 55. The graphics accelerator includes circuitry for rasterizing the data transferred, applying texture information, and rendering the pixel data defining the triangle to a frame buffer. In addition, the device 55 may include a transformation circuit 56 designed in accordance with the present invention.

Although the present invention has been described in terms of a number of embodiments, it will be appreciated that various modifications and alterations might be made by those skilled in the art without departing from the spirit and scope of the invention. The invention should therefore be measured in terms of the claims which follow.

What is claimed is:

1. A circuit for providing a perspective correct transformation of attribute values at positions defining a planar polygon in world space to attribute values at pixels describing the polygon in screen space comprising:
   a first circuit for determining a series of presetup values defined by coordinates of vertices of the polygon which are constant throughout the polygon,
   a second circuit for computing setup values for each attribute which are constant throughout the polygon from the presetup values,
   a third circuit for computing from the setup values for each attribute a result for the attribute which is constant at any pixel describing the polygon,
   a fourth circuit for determining a reciprocal of a result of a depth attribute computed by the third circuit, and
   a fifth circuit for combining the values of the result computed by the third circuit for each attribute and the reciprocal value for each pixel of the polygon.

2. A circuit as claimed in claim 1 in which the first circuit receives screen coordinates of vertices of the polygon as input values.

3. A circuit as claimed in claim 1 in which the first circuit receives world space coordinates of vertices of the polygon as input values.

4. A circuit as claimed in claim 1 in which the first circuit determines the series of presetup values utilizing absolute values of coordinates of vertices of the polygon.

5. A circuit as claimed in claim 1 in which the first circuit determines the series of presetup values utilizing values of coordinates of vertices of the polygon relative to one vertex of the polygon in screen space.

6. A circuit as claimed in claim 1 in which the first circuit determines the series of presetup values utilizing absolute values of attributes of the polygon.

7. A circuit as claimed in claim 1 in which the first circuit determines the series of presetup values utilizing values of attributes relative to one vertex of the polygon in world space.

8. A circuit for providing a perspective correct transformation of attribute values defined at positions fixing a planar polygon in world space into attribute values at pixels describing the polygon in screen space for two pixels which vary in position in only a single screen direction comprising the steps of:

a first circuit for determining a series of presetup values defined by coordinates of vertices of the polygon which are constant throughout the polygon, a second circuit for computing setup values for each attribute which are constant throughout the polygon from the presetup values, a third circuit for computing from the setup values for each attribute a result for the attribute which is constant at any pixel describing the polygon, a fourth circuit for determining a reciprocal of a result of a depth attribute computed by the third circuit, a fifth circuit for combining the values of the result computed by the third circuit for each attribute and the reciprocal value for a first pixel of the polygon, a sixth circuit for computing from the setup values only changes for each attribute for any second pixel which varies in position from the first pixel in only a single screen direction, and a seventh circuit for determining a result for each attribute which is constant for the second pixel by varying each attribute of the first pixel by the changes affecting that attribute.

9. A method for providing a perspective correct transformation of attribute values defined at positions fixing a planar polygon in world space into attribute values at pixels describing the polygon in screen space comprising the steps of:

using coordinates of vertices of the polygon to determine a series of presetup values which are constant throughout the polygon, computing setup values for each attribute which are constant throughout the polygon from the presetup values, computing from the setup values for each attribute a result for the attribute which is constant at any pixel describing the polygon, determining a reciprocal of a result of a depth attribute, and combining the values of the result computed for each attribute and the reciprocal value for each pixel of the polygon.

10. A method as claimed in claim 9 in which the coordinates of vertices of the polygon used to determine a series of presetup values are screen coordinates of vertices of the polygon.

11. A method as claimed in claim 9 in which the coordinates of vertices of the polygon used to determine a series of presetup values are world coordinates of vertices of the polygon.

12. A method as claimed in claim 9 in which the coordinates of vertices of the polygon used to determine a series of presetup values are absolute values of coordinates of vertices of the polygon.

13. A method as claimed in claim 9 in which the coordinates of vertices of the polygon used to determine a series of presetup values are values of coordinates of vertices of the polygon relative to one vertex of the polygon in screen space.

14. A method as claimed in claim 9 in which the attribute values defined at positions fixing a planar polygon in world space are absolute values of attributes of the polygon.

15. A method as claimed in claim 9 in which the attribute values defined at positions fixing a planar polygon in world space are values of attributes relative to one vertex of the polygon in world space.

16. A method for providing a perspective correct transformation of attribute values defined at positions fixing a planar polygon in world space into attribute values at pixels describing the polygon in screen space for two pixels which vary in position in only a single screen direction comprising the steps of:

using coordinates of vertices of the polygon to determine a series of presetup values which are constant throughout the polygon, computing setup values for each attribute which are constant throughout the polygon from the presetup values, computing from the setup values for each attribute a result for the attribute which is constant at any pixel describing the polygon, determining a reciprocal of a result of a depth attribute, combining the values of the result computed for each attribute and the reciprocal value for each pixel of the polygon to obtain attributes for a first pixel, computing from the setup values only changes for each attribute for any second pixel which varies in position from the first pixel in only a single screen direction, determining a result for each attribute which is constant for the second pixel by varying each attribute of the first pixel by the changes affecting that attribute, determining a reciprocal of a result of a depth attribute for the second pixel, and combining the values of the result computed for each attribute and the reciprocal value for the second pixel of the polygon to obtain attributes for the second pixel.

\* \* \* \* \*